Figure 1:
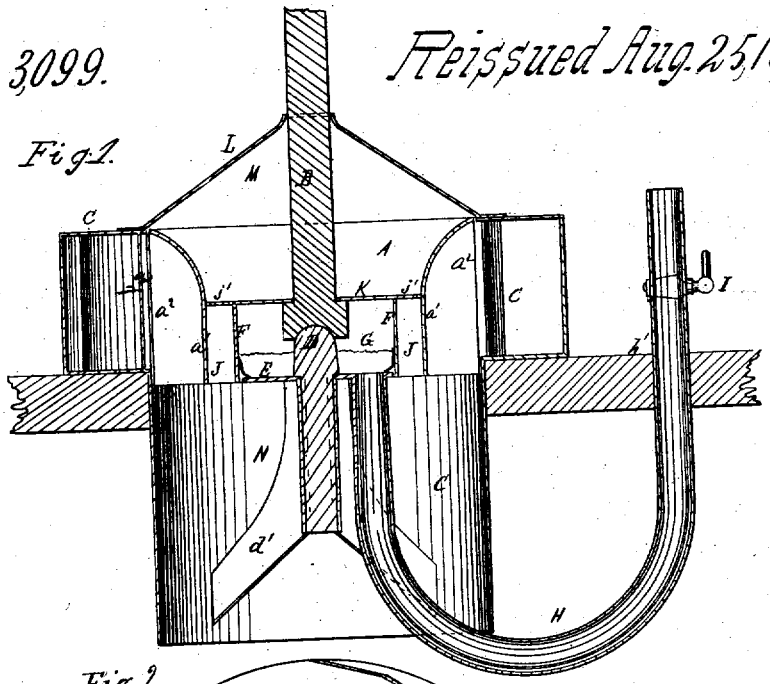
Figure 2:
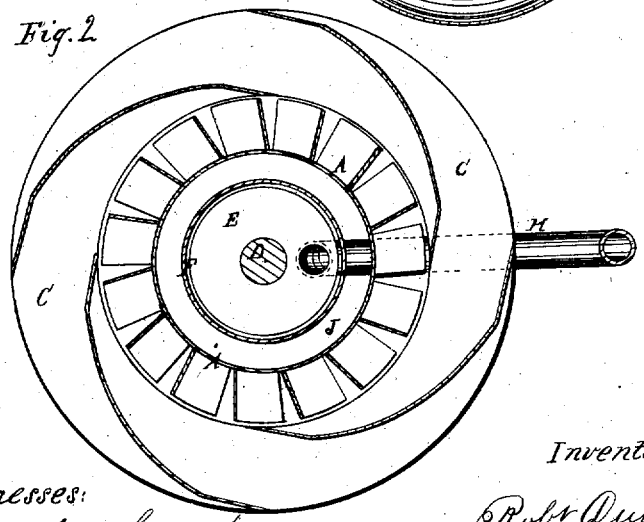

R. Dunbar,

Water Wheel.

No. 3,099. Reissued Aug. 25, 1868.

Witnesses:

E. B. Forbush

B. H. Muehle

Inventor.

Robt Dunbar

N. PETERS, PHOTO-LITHOGRAPHER, WASHINGTON, D. C.

United States Patent Office.

ROBERT DUNBAR, OF BUFFALO, NEW YORK.

*Letters Patent No.* 67,174, *dated July* 30, 1867; *reissue No.* 3,099, *dated August* 25, 1868.

IMPROVEMENT IN WATER-WHEELS.

The Schedule referred to in these Letters Patent and making part of the same.

TO ALL WHOM IT MAY CONCERN:

Be it known that I, ROBERT DUNBAR, of the city of Buffalo, county of Erie, and State of New York, have invented certain new and useful Improvements in Water-Wheels; and I do hereby declare that the following is a full and exact description thereof, reference being had to the accompanying drawings, making a part of this specification, in which—

Figure I is a vertical section of my improved water-wheel, and

Figure II is a horizontal section of the same.

Letters of like name and kind refer to like parts in each of the figures.

My invention relates to that class of turbine water-wheels, in which the hydrostatic pressure of a column of water is thrown against the under side of the hub-plate, to relieve the pressure and friction of the wheel-shaft on its step.

Hitherto this relief has been only partially obtained, owing, first, to the leakage of water through the enclosing-case at the shaft and over the bucket-rim, so as to accumulate on the hub-plate, and load the wheel; second, to the formation of a partial vacuum below the wheel, by the action of the waste water, thus adding the corresponding atmospheric pressure to the load on the wheel.

The nature of my invention consists—

First, in connecting the chamber formed between the hub-plate and case-cover with the discharge-pipe, by a passage outside of the area of that part of the hub-plate subjected to said hydrostatic pressure, so that an equilibrium in the atmospheric pressure above and below the wheel will be established, and the leakage carried off, thereby utilizing the full benefit of said hydrostatic pressure to relieve the footstep-bearing.

Second, in forming a hydrostatic chamber of less diameter than the hub-plate, so as to leave an annular chamber between the hydrostatic chamber and bucket-rim, through which chamber the aforesaid equilibrium-passages may be secured for the purpose stated.

A represents a turbine water-wheel, having a hub and buckets, which may be of any well-known or common construction. It is keyed to the vertical shaft B, and is placed within a wheel-case, C, of common construction.

The footstep-bearing of the shaft B is located within the wheel, as shown at D, being supported upon legs or flanges, *d'*, which connect with the lower extension of the case or tube, as shown. Immediately below this bearing, a circular horizontal disk, E, is placed, and attached securely to the footstep. F represents a rim, extending or projecting, from the hub or centre-plate K of the wheel, downwardly, its lower end surrounding the disk E in a manner to form, in combination with the said plate, a chamber, G, in which the footstep-bearing D is located or enclosed. A pipe, H, leads from the chamber G, into which it opens, through the stationary disk E, downwardly, and around or through the lower case or tube, and connects to the bottom of the flume, as shown at *h'*, its other open end projecting upwardly in the flume, and being provided with a stop-cock, I. By this means, a small portion of the head-water in the flume may be conveyed into the chamber G, whereby upward pressure is obtained on the hub-plate, which operates to sustain the weight of the wheel, and thereby prevent that excessive friction and wear of the foot of the shaft in its step, which would otherwise ensue.

The disk E may be provided with a packing, as shown in red lines, fig. 1, so as to retain all the water in the chamber G, or the disk may be made to fit closely to the rim F, and allow but little water to waste. By means of the stop-cock I, more or less of the head-water may be admitted into the chamber G, as may be desired. J represents an annular chamber, formed between the rim F and the main hub-rim *a'* of the wheel. It is open at the bottom, and holes, *j'*, are made through the hub-plate K, to open a communication with the chamber M. The plate K and rim *a'* constitute the hub. Great inconvenience has been experienced on account of water entering through the eye of the cover L of the case around the shaft, or over the top edge of the wheel, and collecting upon the centre-plate thereof, adding greatly to the weight of the wheel, by allowing the whole head of water to press upon it. By means of the passages so formed between the chambers M and N, the water that would otherwise collect in the chamber M, on the hub-plate, is readily carried off, and an equilibrium of atmospheric pressure between the two chambers maintained, thereby relieving the wheel of that labor which the combined pressure of the water and atmosphere above, due to the partial vacuum formed beneath the wheel, would impose on it, were no such means of communication provided.

What I claim as my invention, and desire to secure by Letters Patent, is—

1. A passage or communication formed between the chambers M and N, outside of the hydrostatic chamber G, substantially as and for the purpose set forth.

2. The rim F, connected with and extending downwardly from the plate K, on a circle of less diameter than the hub of the wheel, so as to form, in combination with the plate K and stationary disk E, the lesser annular chamber G, and, in combination with the hub, the larger annular chamber J, for the purpose and substantially as described.

ROB'T DUNBAR.

Witnesses:
V. H. BECKER,
EDWARD WILHELM.